(12) United States Patent
Case et al.

(10) Patent No.: US 8,023,144 B2
(45) Date of Patent: Sep. 20, 2011

(54) METHOD FOR GENERATING TRANSPOSED IMAGE DATA

(75) Inventors: Christopher Wilson Case, Georgetown, KY (US); David A. Crutchfield, Georgetown, KY (US); James Alan Ward, May's Lick, KY (US)

(73) Assignee: Lexmark International, Inc., Lexington, KY (US)

( * ) Notice: Subject to any disclaimer, the term of this patent is extended or adjusted under 35 U.S.C. 154(b) by 1407 days.

(21) Appl. No.: 11/456,651

(22) Filed: Jul. 11, 2006

(65) Prior Publication Data

US 2008/0013119 A1 Jan. 17, 2008

(51) Int. Cl.
*G06K 15/00* (2006.01)
*H04N 1/405* (2006.01)
*H04N 1/46* (2006.01)

(52) U.S. Cl. ............ 358/1.16; 358/3.06; 358/3.09; 358/3.1; 358/534

(58) Field of Classification Search .......... 358/3.06, 358/3.09, 3.1, 3.3, 534; 399/181; 347/131
See application file for complete search history.

(56) References Cited

U.S. PATENT DOCUMENTS

| 4,741,045 A * | 4/1988 | Denning ............ 382/178 |
| 2005/0046653 A1 * | 3/2005 | Yamazaki ........... 347/15 |

* cited by examiner

*Primary Examiner* — Thomas Lett

(57) ABSTRACT

A method for generating transposed image data for use in an imaging apparatus having access to a memory includes (a) generating a set of data blocks corresponding to at least a portion of image data representing an image to be printed; (b) performing a combined format and transpose operation on the set of data blocks; and (c) storing a result of the combined format and transpose operation in the memory.

16 Claims, 5 Drawing Sheets

METHOD FOR GENERATING TRANSPOSED IMAGE DATA

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates generally to imaging, and more particularly to a method for generating image data for use in an imaging apparatus, including performing a combined format and transpose operation.

2. Description of the Related Art

In prior art, ink jet printing systems produce images by printing patterns of dots on a sheet of print media, such as paper. Such systems typically include two main mechanisms for determining the location of dots on the page, namely, a halftone mechanism and a formatting mechanism. Such mechanisms may be implemented, for example, in software, firmware, hardware, or a combination thereof, and may reference one or more lookup tables.

The halftone mechanism compensates for the inability of an ink jet printer, i.e., a binary printer, to print a continuous range of tones. For example, a binary printer can only produce colors by either printing or not printing a dot of ink. By printing patterns of various percentages of ink in a given area between zero percent and 100 percent ink, in effect many shades can be produced. Thus, halftoning involves the eventual pattern of dots placed on a page as a result of the printing process and the halftone pattern is visible to the user after the page is completely rendered.

Once the halftone mechanism has decided where the dots of ink are to be placed on the page, the formatter mechanism generates color raster data, e.g., cyan, magenta, yellow, and black (CMYK) raster data. Traditionally, during print data generation the CMYK rasters are first formatted for the targeted printhead and placed into printer main memory. A transpose operation, which is separate and independent from the format operation, then reads the stored formatted image data from the printer main memory, performs the transpose function, and sends the transposed image data to the printhead logic.

As used herein, the term "format", and derivatives thereof, refer to an operation in which halftone image data is converted for printing on a particular pass of a particular printhead over the sheet of print media. Also, as used herein, the term "transpose", and derivatives thereof, refers to an operation where the formatted image data is rearranged to meet the requirements of the printhead logic of the printhead used in performing the printing operation.

The transpose operation may be a direct memory access (DMA) bandwidth intense operation and usually becomes a cost versus performance tradeoff. For instance, it may be desirable to use a 32×32 bit transpose array (e.g., a bit accessible flip-flop array) to allow for one word in and one word out memory accesses. Acceptable DMA bandwidth requirements are met in this configuration at a relatively low cost in logic area. However, if better performance was needed then a 64×64 array might be used to allow for two words in and two words out from/to memory. This would allow for a 50 percent increase in DMA performance but a greater than 400 percent increase in logic area or cost.

As the amount of data needed to drive high-resolution printheads increases, it is important to find ways to either minimize the data or minimize the memory accesses needed during processing without substantially increasing the logic needed.

SUMMARY OF THE INVENTION

The invention, in one form thereof, is directed to a method for generating transposed image data for use in an imaging apparatus having access to a memory. The method includes (a) generating a set of data blocks corresponding to at least a portion of image data representing an image to be printed; (b) performing a combined format and transpose operation on the set of data blocks; and (c) storing a result of the combined format and transpose operation in the memory.

The invention, in another form thereof, is directed to a method for generating transposed image data for use in an imaging apparatus. The method includes (a) generating a set of data blocks corresponding to a portion of image data representing an image to be printed; (b) performing a format operation on the set of data blocks to generate a set of formatted data blocks; and (c) performing a transpose operation on the set of formatted data blocks to generate a set of transposed data blocks.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
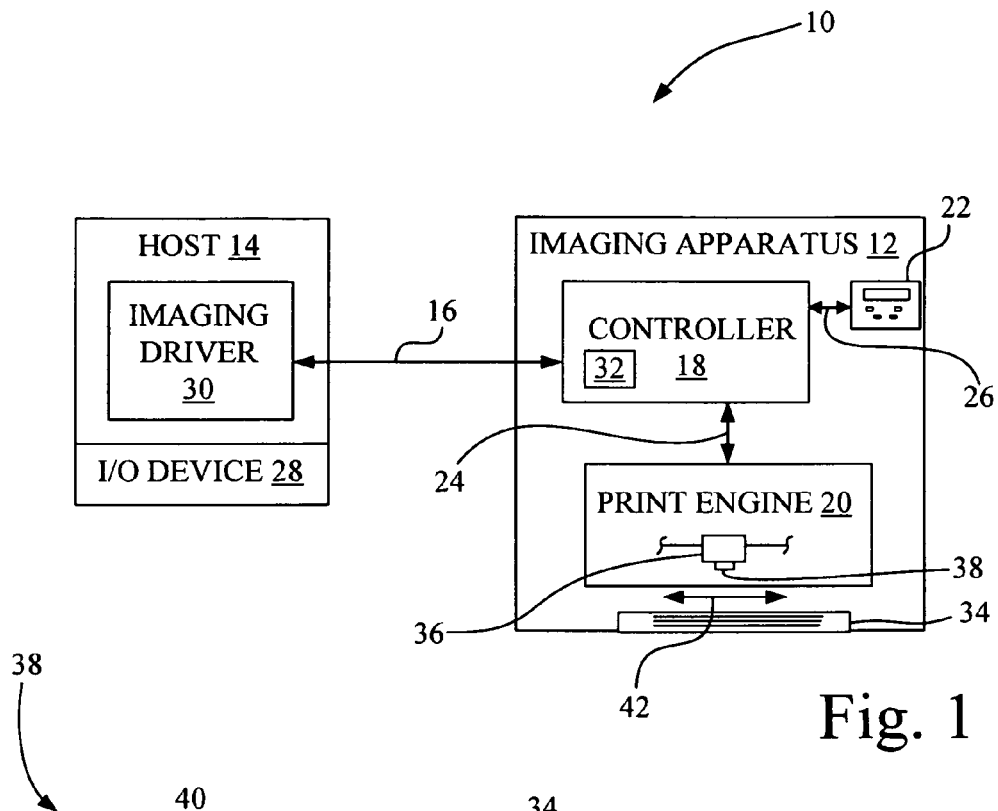
FIG. 1 is a diagrammatic representation of a system employing an embodiment of the present invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

Referring now to the drawings and particularly to FIG. 1, there is shown a diagrammatic depiction of an imaging system 10 embodying the present invention. Imaging system 10 includes an imaging apparatus 12 and a host 14. Imaging apparatus 12 communicates with host 14 via a communications link 16. As used herein, the term "communications link" is used to generally refer to structure that facilitates electronic communication between multiple components, and may operate using wired or wireless technology. Communications link 16, for example, may be established by a direct cable connection, wireless connection or by a network connection such as for example an Ethernet local area network (LAN).

Imaging apparatus 12 may be, for example, an ink jet printer and/or copier, or an all-in-one (AIO) unit that includes a print engine, a scanner unit, and possibly a fax unit that incorporate multiple functions such as scanning, copying, and printing capabilities in one device. An AIO unit is also known in the art as a multifunction machine. In the example shown in FIG. 1, imaging apparatus 12 includes a controller 18, a print engine 20, and a user interface 22. Print engine 20 may utilize ink jet technology, or other printing technology consistent with this disclosure. Imaging apparatus 12 may communicate with host 14 via a standard communication protocol, such as for example, universal serial bus (USB), Ethernet or IEEE 812.1x.

In the present embodiment, controller 18 communicates with print engine 20 via a communications link 24. Controller 18 communicates with user interface 22 via a communications link 26. Communications links 24 and 26 may be established, for example, by using standard electrical cabling or bus structures, or by wireless connection.

Host 14 may be, for example, a personal computer including an input/output (I/O) device 28, such as keyboard and display monitor. Host 14 further includes a processor, input/output (I/O) interfaces, memory, such as RAM, ROM, NVRAM, and a mass data storage device, such as a hard drive, CD-ROM and/or DVD units. During operation, host 14 includes in its memory a software program including program instructions that function as an imaging driver 30, e.g., printer driver software, for imaging apparatus 12. Imaging driver 30 is in communication with controller 18 of imaging apparatus 12 via communications link 16. Imaging driver 30 facilitates communication between imaging apparatus 12 and host 14, and may provide print data to imaging apparatus 12, and more particularly, to print engine 20.

Alternatively, however, all or a portion of imaging driver 30 may be located in controller 18 of imaging apparatus 12. For example, where imaging apparatus 12 is a multifunction machine having standalone capabilities, controller 18 of imaging apparatus 12 may include an imaging driver configured to support a copying function, and/or a fax-print function, and may be further configured to support a printer function. For example, the imaging driver may facilitate communication of print data, as determined by a selected print mode, to print engine 20.

Controller 18 includes a processor unit and an associated memory 32, and may be formed as one or more Application Specific Integrated Circuits (ASIC). Memory 32 may be, for example, random access memory (RAM), read only memory (ROM), and/or non-volatile RAM (NVRAM). Alternatively, memory 32 may be in the form of the seperate electronic memory (e.g., RAM, ROM, and/or NVRAM), a hard drive, a CD or DVD drive, or any memory device convenient for use with controller 18. Controller 18 serves to process print data and to operate print engine 20 during printing. In the context of the examples for imaging apparatus 12 given above, print engine 20 may be, for example, an ink jet print engine configured for forming an image on a sheet of print media 34, such as a sheet of paper, transparency or fabric.

Print engine 20 may include, for example, a reciprocating printhead carrier 36 that carries at least one ink jet printhead 38, and may be mechanically and electrically configured to mount, carry and facilitate multiple cartridges, such as a monochrome printhead cartridge and/or one or more color printhead cartridges, each of which includes a respective printhead 38. For example, in systems using cyan, magenta, yellow and black inks (CMYK), printhead carrier 36 may carry four printheads, one printhead for each of cyan, magenta, yellow and black. As a further example, a single printhead, such as printhead 38, may include multiple ink jetting arrays, with each array associated with one color of a plurality of colors of ink. In such a printhead, for example, printhead 38 may include cyan, magenta, and yellow nozzle arrays for respectively ejecting full strength cyan (C) ink, full strength magenta (M) ink and yellow (Y) ink. Further, printhead 38 may include dilute colors, such as dilute cyan (c), dilute magenta (m), etc. The term, dilute, is used for convenience to refer to a ink that does not have a luminance intensity as high as that associated with a corresponding full strength ink of substantially the same chroma, and such dilute inks may be, for example, either dye based or pigment based.

Figure 2:
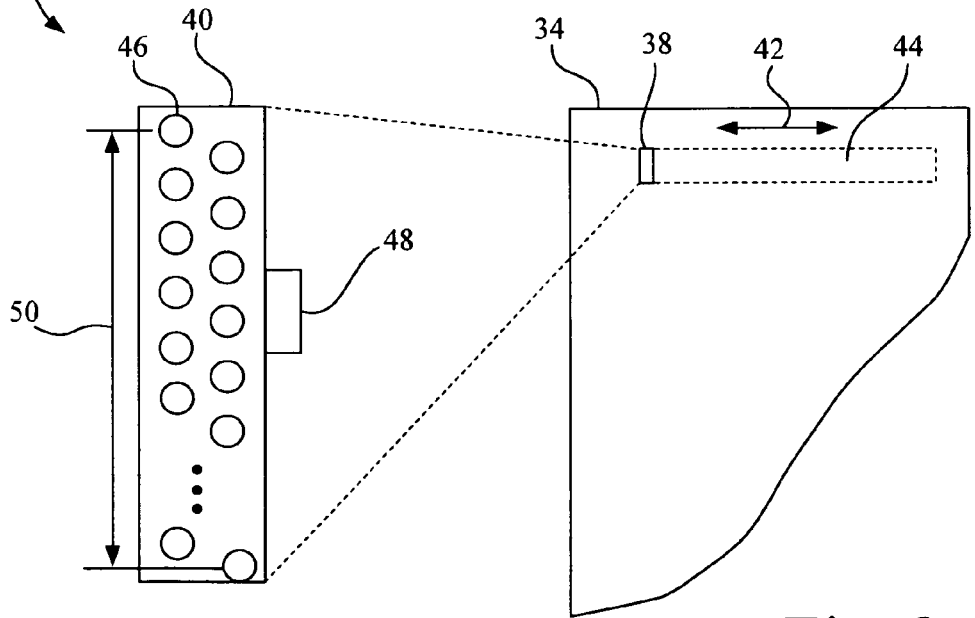
FIG. 2 is a diagrammatic representation of a printhead defining a swath on a sheet of print media.

FIG. 2 illustrates an exemplary nozzle configuration of printhead 38, including a monochrome nozzle array 40 for ease of discussion. Printhead carrier 36 is controlled by controller 18 to move printhead 38 in a reciprocating manner along a bi-directional scan path 42, which will also be referred to herein as horizontal direction 42. Each left to right, or right to left movement of printhead carrier 36 and printhead 38 along bi-directional scan path 42 over sheet of print media 34 is referred to herein as a pass. The area traced by printhead 38 over sheet of print media 34 for a given pass is referred to herein as a swath, such as for example, swath 44 as shown in FIG. 2. Each swath 44 includes a plurality of rasters, i.e., print lines.

In the exemplary nozzle configuration for ink jet printhead 38 shown in FIG. 2, nozzle array 40 includes a plurality of ink jetting nozzles 46 and associated printhead logic 48. Also associated with each nozzle of the plurality of ink jetting nozzles 46 is an actuator (not shown), e.g., a resistive heater, which when energized ejects ink from a respective nozzle. Printhead logic 48 receives transposed print data, e.g., via a DMA operation invoked by controller 18 transferred through communications link 24, from memory 32, and delivers the transposed print data to the respective nozzles of the plurality of nozzles 46 during a printing operation.

As within a particular nozzle array, the nozzle size may be, but need not be, the same size. A swath height 50 of swath 44 corresponds to the distance between the uppermost and lowermost of the nozzles of printhead 38.

Those skilled in the art will recognize that the discussion above with respect to FIG. 2 regarding a monochrome nozzle array 40 may be easily applied to color printing, e.g., where printhead 38 is a color printhead including multiple arrays representing a plurality of primary full strength colors and/or dilute colors of ink.

Figure 3:
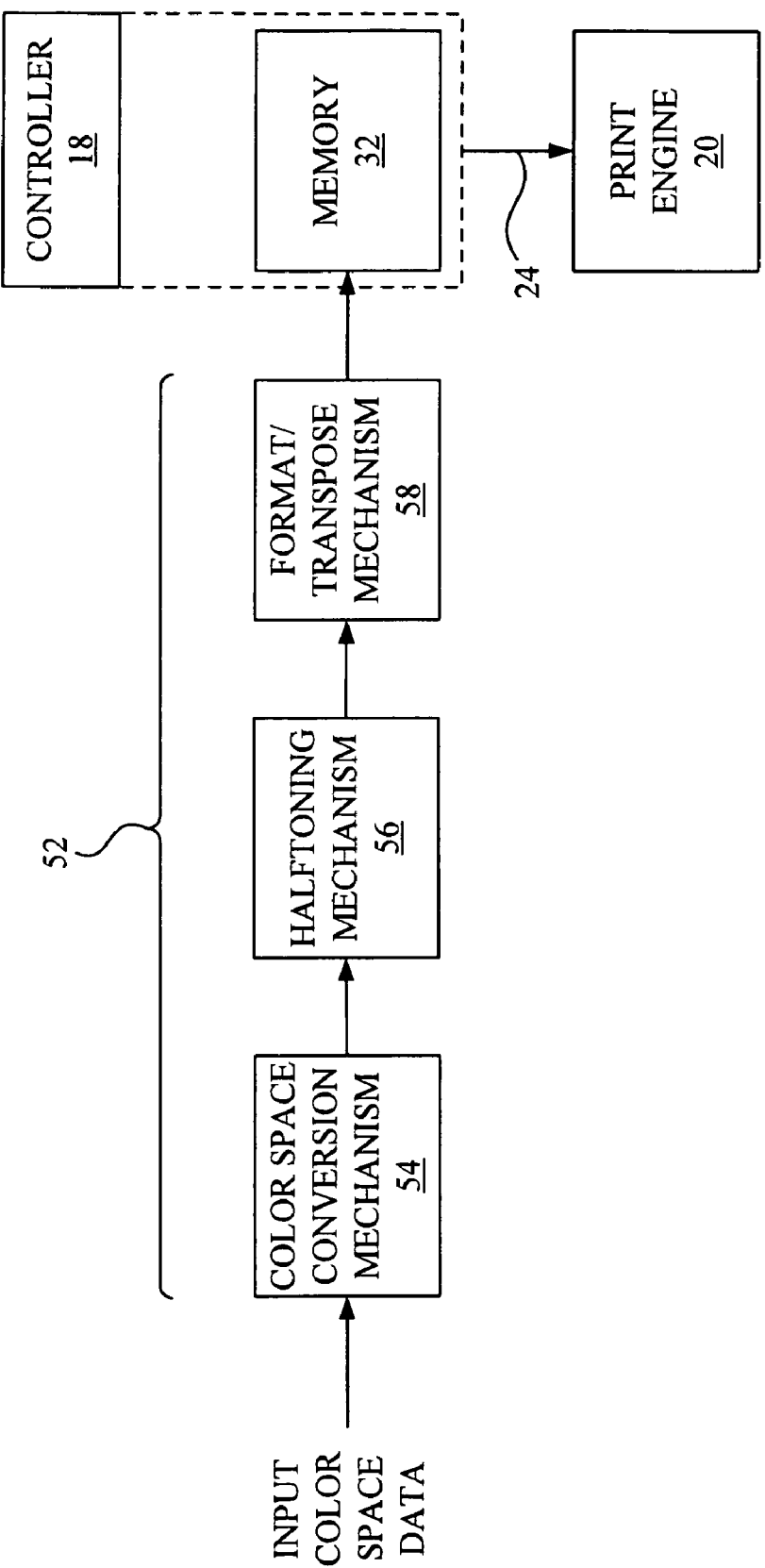
FIG. 3 is a block diagram of an embodiment of a data conversion mechanism that may be utilized in the imaging system of FIG. 1.

Referring to FIG. 3, in order for print data to be properly printed by print engine 20, the received input color space data is converted into data compatible with print engine 20 and printhead 38. In this regard, a data conversion mechanism 52 is used to convert the input color space data into data compatible with print engine 20. More particularly, in accordance with an embodiment of the present invention, data conversion mechanism 52 receives the input color space data and outputs CMY and K data, formatted and transposed, for accumulation in memory 32, which in turn may be accessed via a DMA operation performed by controller 18 to retrieve one or more full swaths of data for use by each printhead 38 during a printing operation. The input color space may be, for example, $YC_bC_r$ (luminance, chrominance-blue, chrominance-red) color space, RGB (red, green, blue) color space, etc.

Data conversion mechanism 52 may be located in imaging driver 30 of host 14, in controller 18 of imaging apparatus 12, or a portion of data conversion mechanism 52 may be located in each of imaging driver 30 and controller 18. Data conversion mechanism 52 includes a color space conversion mechanism 54, a halftoning mechanism 56, and a format/transpose mechanism 58. Each of color space conversion mechanism 54, halftoning mechanism 56, and format/transpose mechanism 58 may be implemented in software, firmware, hardware, or a combination thereof, and may be in the form of program instructions and associated data arrays and/or lookup tables.

In general, color space conversion mechanism 54 takes signals from one color space domain and converts them into signals of another color space domain for each image generation. As is well known in the art, color conversion may take place to convert from a light-generating color space domain of, for example, a color display monitor that utilizes primary colors red (R), green (G) and blue (B) to a light-reflective color space domain of, for example, a color printer that utilizes colors, such as for example, cyan (C, c), magenta (M, m), yellow (Y) and black (K).

In the example of FIG. 3, input color space data, such as the RGB output from an application executed on host 14 or generated by a scanner, is supplied to color space conversion mechanism 54 to generate continuous tone data. Color space conversion mechanism 54 is communicatively coupled to halftoning mechanism 56.

Halftoning mechanism 56 processes the continuous tone data using a halftoning algorithm to generate halftone image data as an eventual pattern of dots to be placed on a sheet of print media as a result of the printing process. Halftoning mechanism 56 is communicatively coupled to format/transpose mechanism 58.

Format/transpose mechanism 58 processes the halftone image data supplied by halftoning mechanism 56. The general operation of format/transpose mechanism 58 will be described with respect to the flowchart of FIG. 4 depicting a method of generating image data, including performing a combined format and transpose operation.

Figure 4:
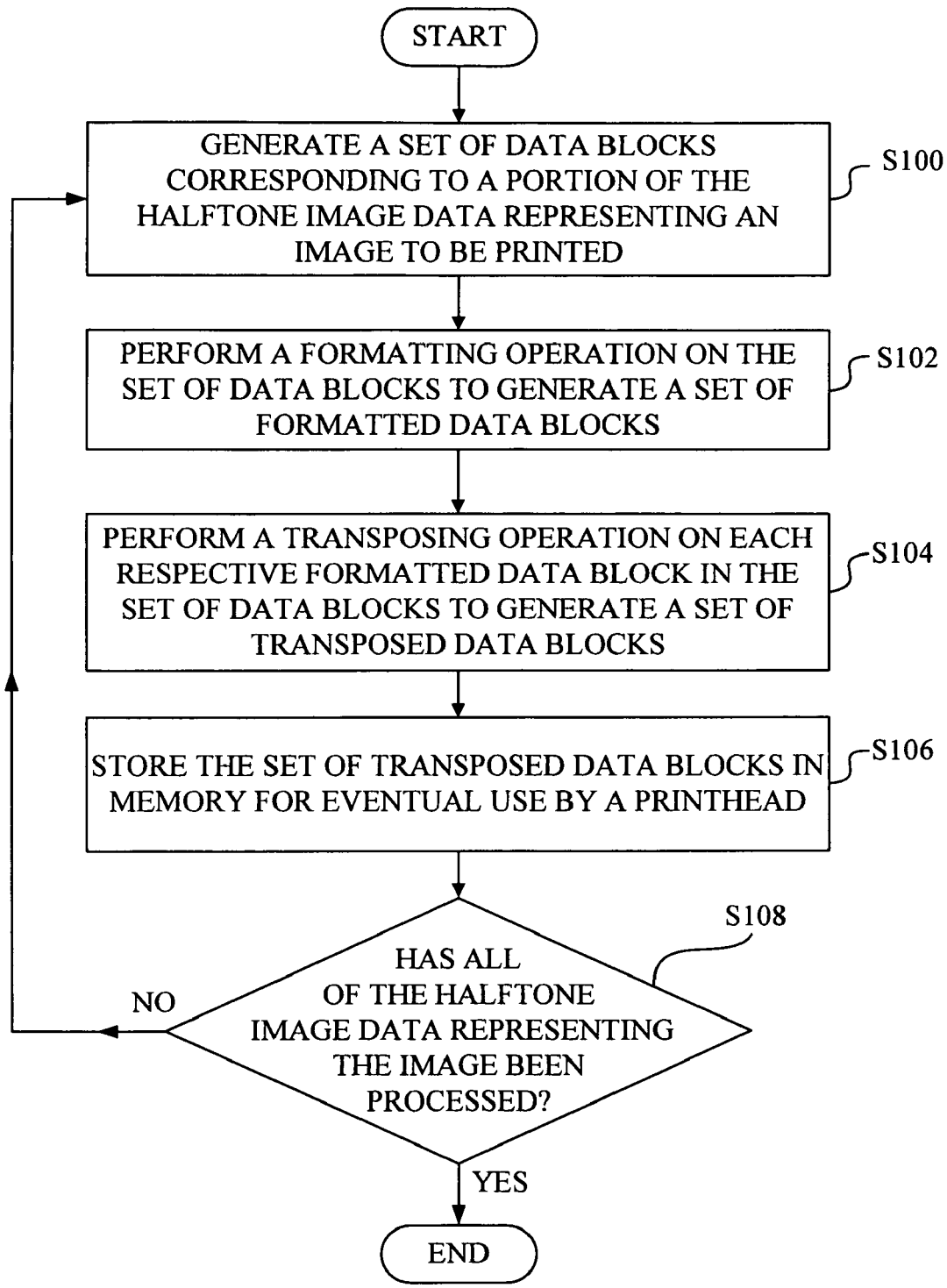
FIG. 4 is a flowchart of the general operation of a format/transpose mechanism of the data conversion mechanism of FIG. 3 in accordance with an embodiment of the present invention.

As shown in FIG. 4, at operation S100, a set of data blocks corresponding to a portion of the halftone image data representing an image to be printed is generated. Due to limitations on the amount of data that may be processed at any one time by format/transpose mechanism 58, format/transpose mechanism 58 essentially divides the halftone image data into a plurality of data blocks along a given raster. The set of data blocks represent a portion, e.g., one or more data blocks but less than all, of the plurality of data blocks needed to process all of the halftone image data. For example, for a 8.5×11 inch media sheet at 1200 dpi, there may be about 319 data blocks horizontally arranged along a given raster, and each block may be 64 bits (rasters) high and 32 bits wide. Assuming in this example that a word is 32 bits, then each block contains 64 32 bit words.

At operation S102, format/transpose mechanism 58 processes the set of data blocks to perform a formatting operation, e.g., print start determination, shingling level (i.e., printing pass determination), etc., on the set of data blocks to generate a set of formatted data blocks.

At operation S104, format/transpose mechanism 58 then performs a transposing operation on each respective formatted data block in the set of data blocks, to generate a set of transposed data blocks, prior to storage of the formatted and transposed data in memory 32. Recall that the transposing operation rearranges the formatted data to accommodate the particular printhead logic of the printhead that is to perform the printing operation, e.g., printhead 38. Format/transpose mechanism 58 is communicatively coupled to memory 32.

In effect, operations 102 and 104 represent a combined format and transpose operation.

At operation S106, the set of transposed data blocks is then stored in memory 32 for eventual use by printhead(s) 38 of print engine 20 in printing the swaths of print data that form the image on the sheet of print media 34.

At operation S108, it is determined whether all of the halftone image data representing the image has been processed by format/transpose mechanism 58. If YES, then format/transpose operation is complete. If NO, then operations 100, 102, 104 and 106 are repeated until all of the halftone data for the image to be printed is processed through format/transpose mechanism 58, with the sets of transposed data blocks being accumulated in memory 32 at least until one or more full swaths of print data is stored in memory 32, at which time it is possible to retrieve the accumulated image data for printing by printhead 38.

Figure 5:
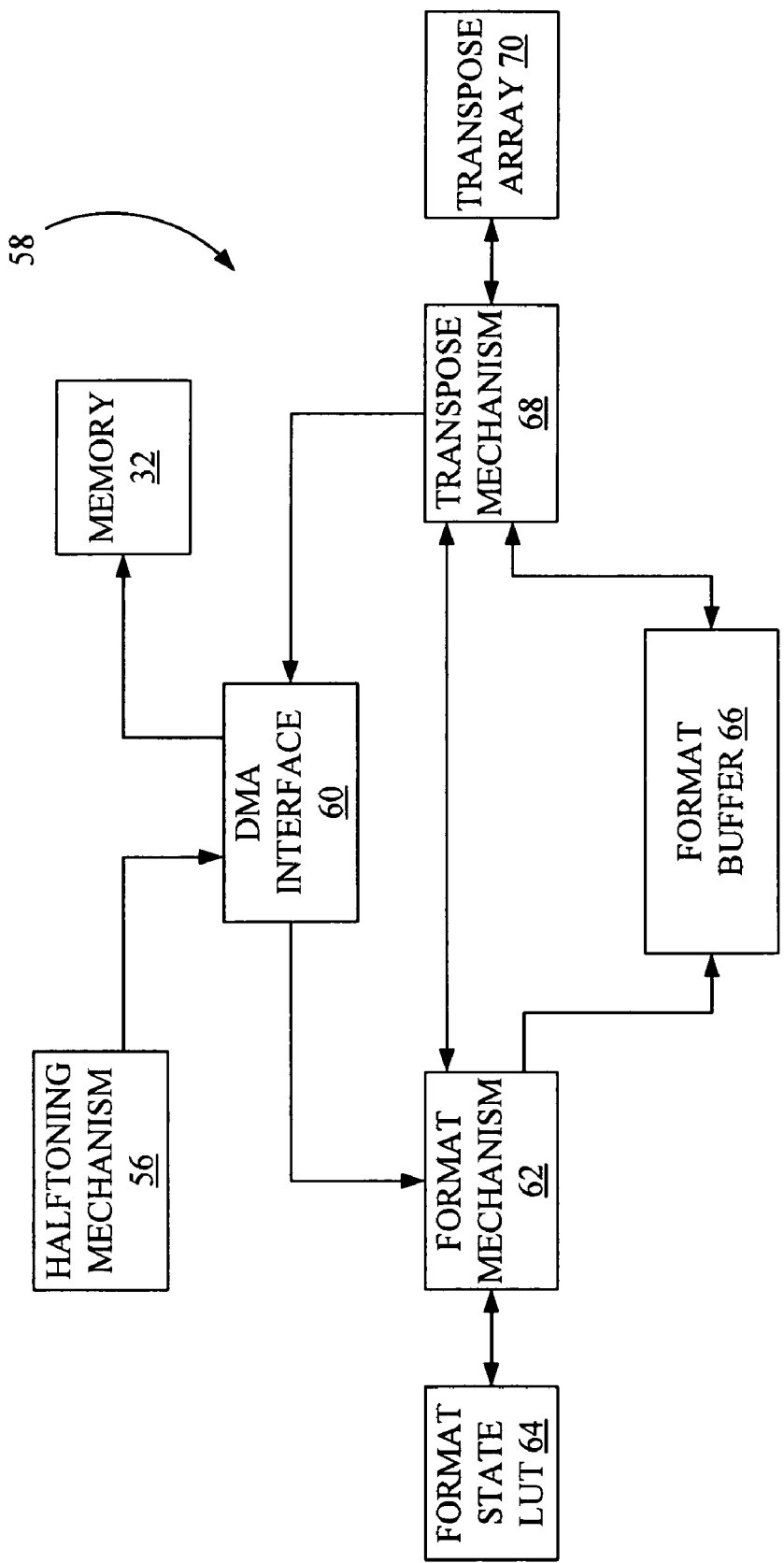
FIG. 5 is a block diagram of the format/transpose mechanism of the data conversion mechanism of FIG. 3.

FIG. 5 is a block diagram of an exemplary configuration of format/transpose mechanism 58. Format/transpose mechanism 58 includes a DMA (direct memory access) interface 60, a format mechanism 62, a format state LUT (lookup table) 64, a format buffer 66, a transpose mechanism 68 and a transpose array 70. In the present embodiment, format/transpose mechanism 58 may be implemented as logic blocks in an ASIC. The arrowed lines in FIG. 5 generally indicate the direction of data and/or instruction flow.

As shown in FIG. 5, DMA interface 60 is communicatively coupled to format mechanism 62 and is communicatively coupled to transpose mechanism 68. Format mechanism 62 is communicatively coupled to transpose mechanism 68. Format state LUT (lookup table) 64 is communicatively coupled to format mechanism 62. Transpose array 70 is communicatively coupled to transpose mechanism 68. Format buffer 66 is communicatively coupled to format mechanism 62 and is communicatively coupled to transpose mechanism 68.

DMA interface 60 is a bi-directional interface which retrieves input data from memory in halftoning mechanism 56 in an In-Burst operation, and outputs transposed image data to memory 32 in an Out-burst operation. DMA interface 60 supplies blocks of data retrieved from halftone memory in multi-word In-Bursts to format mechanism 62. The input to format mechanism 62 is controlled by the DMA interface 60. Also, DMA interface 60 retrieves transposed blocks of data via transpose mechanism 68 in a multi-word Out-Burst operation.

During a formatting operation, format mechanism 62 has access to format state LUT 64, which may be implemented in SRAM (static random access memory) for storing state information between blocks of data. In addition, format mechanism 62 controls format buffer 66, which holds blocks of formatted data before it is passed to transpose mechanism 68.

Format state LUT 64 assists format mechanism 62 during a format operation by storing configuration information or processing requirements for each line of data in format buffer 66, including keeping track of data blocks and their location within the various segments of format buffer 66. For instance, one configuration might be whether the data in a given line is 2 bits per pixel or 1 bit per pixel. Another requirement may be that the data has to be shifted by a number of pixels to align with a print-head nozzle correctly. Each line can be unique and thus a configuration word per line is desirable. In one embodiment, for example, format state LUT 64 may be a 64×93 bit SRAM so as to allow for a 93-bit configuration word per line.

Figure 6:
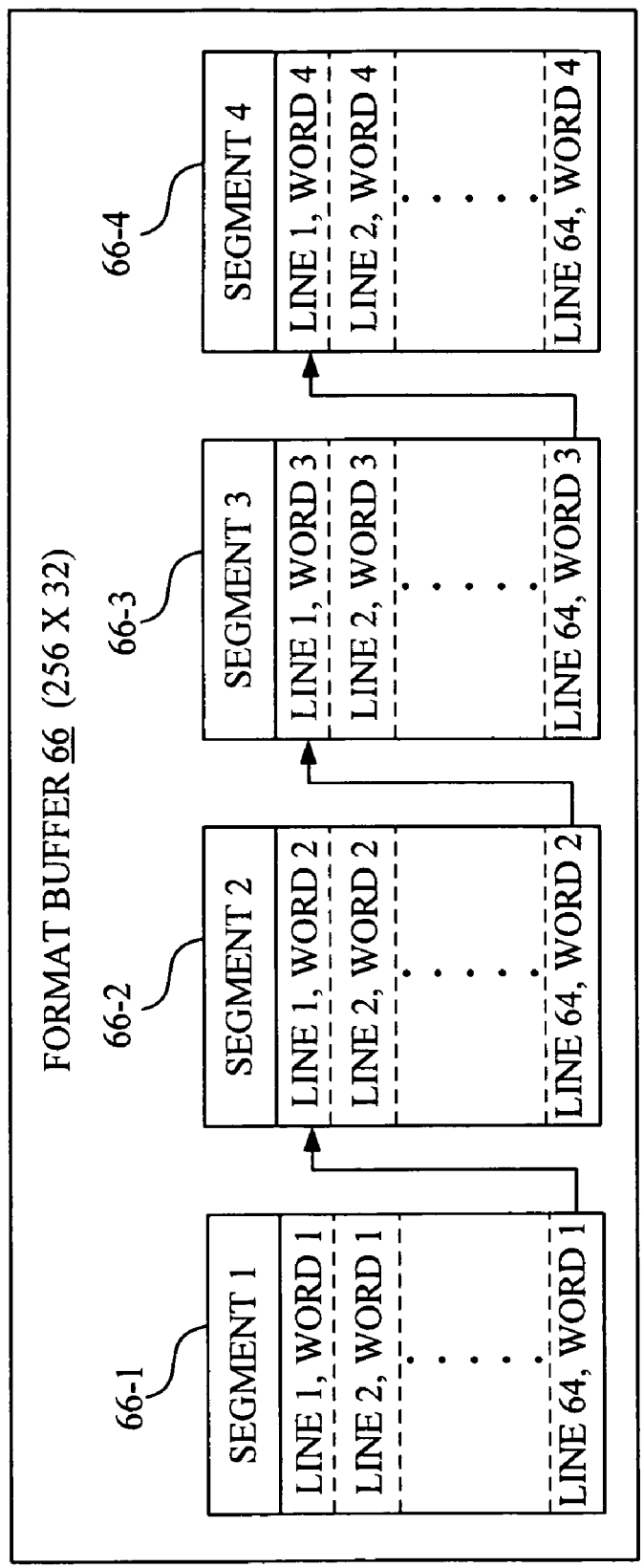
FIG. 6 is a diagrammatic representation of a format buffer of the format/transpose mechanism of FIG. 5.

A block diagram of format buffer 66 is illustrated in FIG. 6. Format buffer 66 may be implemented as a 256×32 bit SRAM buffer. Format mechanism 62 utilizes format buffer 66 by dividing format buffer 66 into a plurality of block-sized segments, e.g., segments 66-1, 66-2, 66-3, and 66-4. In this example, each block-sized segment is 64×32 bits. This allows, for example, during a format operation the handling of 64 lines of four 32 bit word data (64 words total) as four blocks of 64 line data, with each line in each block containing one 32 bit word. Each data block of the four data blocks is accumulated in a respective segment of the plurality of block-sized segments 66-1, 66-2, 66-3, and 66-4 of format buffer 66.

Transpose mechanism 68 has access to format buffer 66 when such access is granted by format mechanism 62, and transpose mechanism 68 utilizes transpose array 70 during a transpose operation. For example, transpose array 70 may be utilized by transpose mechanism 68 during a rotation of the formatted data retrieved from format buffer 66 from a line-read-in orientation to a columnar-read-out orientation.

Transpose mechanism 68, in the present embodiment, may utilize each of the 64×32 buffer segments 66-1, 66-2, 66-3 or 66-4, to create 32-two word bursts output at a time. When given control by format mechanism 62, transpose mechanism 68 reads the first 32 words of a given block from the corresponding buffer segment of format buffer 66, transposes those first 32 words of the block, and places the first transposed 32 words back into the corresponding buffer segment of format buffer 66, i.e., over the first 32 words of format buffer 66. Then, transpose mechanism 68 reads the next 32 words of the given block from format buffer 66, transposes those 32 words of the block, and places those transposed 32 words back into the corresponding buffer segment of format buffer 66, i.e., over the second 32 words of format buffer 66. After the second transpose operation there are 32-two word bursts available to send to main memory 32 in an Out-Burst operation. Because the transposed data will not be contiguous in memory, it will take 32 separate bursts in this example.

Table 1, below, illustrates Burst sizes versus time tradeoffs in a given format/transpose mechanism, such as format/transpose mechanism 58. This correlates to a cost versus performance (e.g., time) tradeoff, since the burse size is dependent of the SRAM memory size (e.g., the larger the SRAM, the larger the Burst size that may be accommodated), and as the size of the SRAM increases there is a corresponding increase in cost. Those skilled in the art will recognize that other combinations not listed in Table 1 could be implemented, if desired.

TABLE 1

| Burst Size vs. Time | | | | | | | | | | |
|---|---|---|---|---|---|---|---|---|---|---|
| In-Burst to Format Buffer 66 (words) | 4 | 4 | 8 | 8 | 4 | 4 | 8 | 8 | 4 | 4 |
| Out-Burst from Format Buffer 66 (words) | 5 | 5 | 2 | 2 | 2 | 2 | 1 | 1 | 1 | 1 |
| Format State LUT 64 Used | No | Yes | No | Yes | No | Yes | No | Yes | No | Yes |
| Time (seconds) | 1.12 | 1 | 1.16 | 1.04 | 1.38 | 1.27 | 1.55 | 1.49 | 1.83 | 1.71 |

In Table 1, time indicates the number of seconds it takes to perform the combined format and transpose operation on a 1200×1200 dpi (dots per inch) four color 8.5×11 inch image. In one embodiment of format/transpose mechanism 58, for example, format buffer 66 is a 256×32 bit SRAM buffer, format state LUT 64 is a 64×93 bit SRAM LUT, and transpose array 70 is a 32×32 bit SRAM array, which allows for 4 words in (In-Burst) and 2 words out (Out-Burst) during DMA accesses before format and after transpose, resulting in a 1.27 second process time. In contrast, if the format and transpose operations were separately and independently implemented, as in the prior art, then the same image may take about 3.75 seconds to process. Thus, with the above described embodiment, a 66 percent reduction in processing time may be achieved when compared to the prior art method wherein the format and transpose operations are separately and independently implemented with intermediate storage to main printer memory.

As may be noted from Table 1, several considerations may be made in choosing the correct performance/size tradeoff. For instance, the best performance target presented in Table 1 utilizes 4 words In-Burst for the format operation and 5 words Out-Burst from the transpose operation, with the use of a format state LUT. In this example, format/transpose mechanism 58 would use a 640×32 bit format buffer 66 and a 160×93 bit format state LUT 64, resulting in a 22 percent increase in performance with a 147 percent larger SRAM requirement compared to the previous embodiment having a 256×32 bit SRAM format buffer and a 64×93 bit SRAM format state LUT.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A method for generating transposed image data for use in an imaging apparatus having access to a memory, comprising:
    (a) generating a set of data blocks corresponding to at least a portion of image data representing an image to be printed;
    (b) performing a combined format and transpose operation on said set of data blocks; and
    (c) storing a result of said combined format and transpose operation in said memory,
wherein a plurality of sets of transposed data blocks generated as a result of performing said combined format and transpose operation are accumulated in said memory at least until one or more full swaths of print data is stored in said memory.

2. The method of claim 1, wherein said combined format and transpose operation includes sequentially formatting said set of data blocks to generate a set of formatted data blocks and transposing formatted image data in said set of formatted data blocks to meet the requirements of printhead logic of a printhead.

3. The method of claim 2, wherein said formatting includes converting halftone image data for printing on a particular pass of said printhead over a sheet of print media.

4. The method of claim 1, wherein said set of data blocks corresponding to said portion of said image data is retrieved from halftone memory by a series of multi-word DMA In-bursts.

5. The method of claim 1, wherein a set of transposed data blocks generated as a result of said combined format and transpose operation are sent to said memory by a series of multi-word DMA Out-bursts.

6. The method of claim 1, wherein said combined format and transpose operation comprises:
    generating a set of formatted data blocks;
    buffering said set of formatted data blocks in an SRAM format buffer;
    retrieving said set of formatted data blocks from said SRAM format buffer; and
    generating a set of transpose data blocks from said set of formatted data blocks.

7. The method of claim 6, wherein a size of said SRAM format buffer is determined by performing a cost versus performance analysis.

8. The method of claim 1, comprising: (d) repeating acts (a) through (c) until all of said image data has been processed.

9. A method for generating transposed image data for use in an imaging apparatus, comprising:
    (a) generating a set of data blocks corresponding to a portion of image data representing an image to be printed;
    (b) performing a format operation on said set of data blocks to generate a set of formatted data blocks; and
    (c) performing a transpose operation on said set of formatted data blocks to generate a set of transposed data blocks,
wherein said set of data blocks corresponding to said portion of said image data is retrieved from halftone memory by a series of multi-word DMA In-bursts.

10. The method of claim 9, wherein said format operation includes converting halftone image data for printing on a particular pass of a printhead over a sheet of print media.

11. The method of claim 10, wherein said transpose operation includes rearranging formatted image data in said set of formatted data blocks to meet the requirements of printhead logic of said printhead.

12. The method of claim 9, wherein a plurality of sets of transposed data blocks are accumulated in a memory at least until one or more full swaths of print data is stored in said memory.

13. The method of claim 9, comprising:
    (d) storing said set of transposed data blocks in a memory; and
    (e) repeating acts (a) through (d) until all of said image data has been processed.

14. A method for generating transposed image data for use in an imaging apparatus, comprising:
    generating a set of data blocks corresponding to a portion of image data representing an image to be printed;
    performing a format operation on said set of data blocks to generate a set of formatted data blocks; and
    performing a transpose operation on said set of formatted data blocks to generate a set of transposed data blocks,
wherein said set of transposed data blocks are sent to a memory by a series of multi-word DMA Out-bursts.

15. A method for generating transposed image data for use in an imaging apparatus, comprising:
    generating a set of data blocks corresponding to a portion of image data representing an image to be printed;
    performing a format operation on said set of data blocks to generate a set of formatted data blocks; and
    performing a transpose operation on said set of formatted data blocks to generate a set of transposed data blocks;
    buffering said set of formatted data blocks in an SRAM format buffer; and
    retrieving said set of formatted data blocks from said SRAM format buffer to perform said transpose operation.

16. The method of claim 15, wherein a size of said SRAM format buffer is determined by performing a cost versus performance analysis.

* * * * *